(12) United States Patent
Alberts et al.

(10) Patent No.: US 9,127,120 B2
(45) Date of Patent: Sep. 8, 2015

(54) PROCESS FOR PREPARING FOAMED POLYMER

(75) Inventors: Albert Henderikus Alberts, Amsterdam (NL); Gad Rothenberg, Amsterdam (NL)

(73) Assignee: UNIVERSITEIT VAN AMSTERDAM, Amsterdam (NL)

( * ) Notice: Subject to any disclaimer, the term of this patent is extended or adjusted under 35 U.S.C. 154(b) by 221 days.

(21) Appl. No.: 13/877,471

(22) PCT Filed: Oct. 17, 2011

(86) PCT No.: PCT/EP2011/068076
§ 371 (c)(1),
(2), (4) Date: Jun. 14, 2013

(87) PCT Pub. No.: WO2012/052385
PCT Pub. Date: Apr. 26, 2012

(65) Prior Publication Data
US 2013/0266788 A1   Oct. 10, 2013

Related U.S. Application Data

(60) Provisional application No. 61/394,396, filed on Oct. 19, 2010.

(30) Foreign Application Priority Data

Oct. 19, 2010   (EP) .................................... 10187999

(51) Int. Cl.
C08J 9/00       (2006.01)
C08J 9/02       (2006.01)
C08G 63/12      (2006.01)

(52) U.S. Cl.
CPC . *C08G 63/12* (2013.01); *C08J 9/00* (2013.01); *C08J 9/02* (2013.01); *C08J 2367/00* (2013.01)

(58) Field of Classification Search
None
See application file for complete search history.

(56) References Cited

U.S. PATENT DOCUMENTS 5,480,963 A * 1/1996 Jiang et al. ................... 528/350
6,861,498 B1   3/2005 Imperante

FOREIGN PATENT DOCUMENTS

CN          101328259 A       12/2008
WO          2010/059925 A1     5/2010
WO       WO 2010059925 A1 *    5/2010

OTHER PUBLICATIONS

Taiwanese First Action dated Mar. 3, 2014, issued in Application No. 2011800502407 and English Translation thereof.
International Search Report of PCT/EP2011/068076 Mailed January 2, 2012.

* cited by examiner

*Primary Examiner* — Kara Boyle
(74) *Attorney, Agent, or Firm* — Miles and Stockbridge

(57) ABSTRACT

The invention pertains to a process for producing a glycerol tri-carboxylic acid polyester foam which comprises the steps of combining glycerol and a tri-carboxylic acid in the liquid phase to provide a reaction mixture, and keeping the reaction mixture at a temperature of between 80° C. and 130° C. from the start of the reaction until a conversion of at least 90% is obtained.

The foamed polyester of the present invention is "green", biodegradable, and non-toxic, and can be cleanly combusted. It finds application in, int. al., packaging materials, insulation materials, and materials with a short life cycle.

13 Claims, No Drawings

PROCESS FOR PREPARING FOAMED POLYMER

CROSS REFERENCE TO RELATED APPLICATIONS

This application is a §371 National Stage Application of PCT/EP2011/068076, filed Oct. 17, 2011, which claims priority to European Application No. 10187999.7, filed Oct. 19, 2010 and U.S. Provisional Application No. 61/394,396, filed Oct. 19, 2010.

BACKGROUND OF THE INVENTION

1. Field of the Invention

The present invention pertains to a process for preparing a foamed polymer, by reacting glycerol with a tri-carboxylic acid.

2. Description of Related Art

Polymer foams are known in the art for various applications, e.g., as packaging material and as insulation material.

A disadvantage of polymer foams known in the art is that they are often based on petroleum-derived sources, which means that they are not renewable, and cannot be classified as "green". A further disadvantage is that they are not biodegradable, which is of particular importance for packaging materials. A still further disadvantage is that some of the materials comprise heteroatoms or aromatic rings, which may cause issues when the material is combusted, such as the formation of SOx/NOx compounds and the release of toxic fumes.

There is therefore need for a polymer foam which solves these problems.

WO2010/059925 describes a polymer obtained by reaction of glycerol with citric acid in a two-step process. In a first step, low-molecular weight polyester pre-polymers are synthesized at a temperature of 80° C. to 250° C., which are then reacted further at a pressure at or above 1 atmosphere and a temperature of 175° C. to 400° C.

It has been found, however, that the process as described in this document has a number of disadvantages.

It was found that the resulting polymer has an unattractive appearance; it suffers from yellowing and an irregular structure.

Further, the stability of the polymer is insufficient. Analysis of the product obtained by this process shows that the carbon content of the product evidences that degradation of the product takes place. The fact that at temperatures of 150° C. and above some of the citric acid decarboxylates to itaconic acid means that it is no longer possible to obtain a fully cross-linked polymer structure. This causes the changes in the polymer properties. Moreover, because this is an extrinsic factor (i.e., its magnitude is related to the size of the system) the changes and problems as a result of polymerization at 150° C. or above will get worse when the process is carried out on a large scale.

SUMMARY

There is therefore need for a process for producing a glycerol tri-carboxylic acid polyester foam which results in a high-quality product, and which can be carried out in a reproducible manner. The present invention provides such a process.

The process of the invention comprises the steps of combining glycerol and a tri-carboxylic acid in the liquid phase to provide a reaction mixture, and keeping the reaction mixture at a temperature of between 80° C. and 130° C. from the start of the reaction until a conversion of at least 90% is obtained, calculated from the water loss based on the weight of the product relative to the weight of the starting acid and glycerol.

DETAILED DESCRIPTION OF A PREFERRED EMBODIMENT

It has appeared that the process of the invention allows the manufacture of polyester foams from glycerol and a tri-carboxylic acid, which foams have good properties while the process can be carried out in a reproducible manner, also for large reactor volumes.

Within the context of the present specification, the word foam refers to a glycerol-tricarboxylic acid polyester material with a density below 1 g/ml, specifically below 0.9 g/ml.

The starting materials for the present invention are glycerol and a tri-carboxylic acid. The tri-carboxylic acid may be any tri-carboxylic acid which has three carboxylic acid groups and at most 15 carbon atoms. Examples include citric acid, isocitric acid, aconitic acid (both cis and trans), and 3-carboxy-cis,cis-muconic acid. The use of citric acid is considered preferable, both for reasons of costs and of availability. The citric acid can be provided in anhydrous form. However, as the presence of water is not detrimental to the process, it is possible, and preferred, to use citric acid monohydrate as starting material.

In one embodiment, the molar ratio between the glycerol and the tricarboxylic acid is between 1.5:1 and 1:1.5, preferably between 1.2:1 and 1:1.2, more preferably between 1.1:1 and 1:1.1. The theoretical molar ratio is 1:1.

In another embodiment, an excess amount of glycerol is used. This is believed to lead to a product with a higher flexibility. In this embodiment, the molar ratio between the glycerol and the tricarboxylic acid is more than 1.2:1, in particular more than 1.5:1. The molar ratio between glycerol and tricarboxylic acid may be at least 1.6:1. As a maximum value a range of 3:1 may be mentioned.

The glycerol and the tri-carboxylic acid are combined to form a liquid phase. This can be done by heating the mixture to a temperature where the acid will dissolve in the glycerol. This may be, for example, at a temperature in the range of 90-130° C. In one embodiment, the mixture may be heated and mixed for a period of 5 minutes to 2 hours, more specifically 10 minutes to 45 minutes, at a temperature of 100-130° C. If water is added, the temperature may be lower, e.g., in the range of 40° C. or higher, e.g., at a temperature of 40-100° C., in particular 50-100° C., because the water will help to dissolve the acid in the glycerol. In this embodiment, the mixture may be may be heated and mixed for a period of 5 minutes to 2 hours, more specifically 10 minutes to 45 minutes, at a temperature in the specified range.

If so desired, a polymerisation catalyst may be added to the reaction mixture. Suitable catalysts for polyester manufacture are known in the art. They include, e.g., p-toluene sulphonic ester and tin oxalate, and sulphuric acid. It is within the scope of the skilled person to select a suitable catalyst.

It has been found, however, that the use of a catalyst is generally not required.

The polymer aimed for is the reaction product of glycerol and a tri-carboxylic acid. Other components may be present in the reaction medium, but not to an extent that they substantially interfere with the nature of the reaction product. Suitable components that may be present include catalysts and colorants. In general less than 20 wt. % of the reaction mixture should be made up of other components, preferably less than 15 wt. %, more preferably less than 10 wt. %. In some embodiments it may be preferred for the mixture to contain less than 5 wt. % of additional components, or even less than 2 wt. %. The above pertains to components which end up in the final product. Water, which is evaporated from the final product and other gaseous components that may be added, if any, are not included herein.

The liquid mixture comprising glycerol and tri-carboxylic acid is brought to reaction conditions. Reaction conditions include a temperature of between 80° C. and 130° C. from the start of the reaction until a degree of conversion of at least 90% is obtained. The reaction will start when the mixture is brought to a temperature of 80° C. or higher. This can be seen from an increase in viscosity in the reaction mixture. The degree of conversion of at least 90% can be determined from the weight of the product.

It is a key feature of the process according to the invention that the temperature of the reaction mixture is not elevated above 130° C. before a conversion of at least 90% has been obtained. It has been found that when this criterion is not met, the tri-carboxylic acid, e.g., citric acid may decarboxylate to form the corresponding di-carboxylic acid, e.g., itaconic acid. This can be seen from an increase in carbon and hydrogen content of the material, as can be derived from elemental analysis from combustion data.

The conversion of the tri-carboxylic acid to a di-carboxylic acid detrimentally affects the properties of the polymer. The structure of the polymer becomes brittle and the polymer suffers from decolorisation.

In one embodiment, the polymer that may be manufactured by the process according to the invention is a glycerol-tricarboxylic acid polyester, in particular a glycerol citric acid polyester, with a carbon content of at most 43.00% and a hydrogen content of at most 5.40%.

It is preferred that the temperature of the reaction mixture is not elevated above 130° C. before a conversion of at least 95% has been obtained, more in particular a conversion of at least 98%. It is believed that when the reaction is complete or substantially complete, the polymer will tolerate higher temperatures, because at that point in time the acid has already been polymerized, reducing the risk of decarboxylation. For example, it has been found that when the desired degree of conversion is reached, the polymer can be heated further to a temperature of, e.g., 150° C. without further problems. This means that it can be used in many industrial and technological applications without any problems.

It is preferred for the temperature of the reaction mixture to be not elevated above 125° C. before a conversion of at least 90% has been obtained. A maximum temperature of 120° C. may be more preferred. It is also preferred that temperatures above these values are not reached before a conversion of at least 95% has been obtained, more in particular a conversion of at least 98%.

The lower limit of the temperature during the reaction is 80° C. When the temperature is kept below this value for the entire time period from the start of the reaction until a conversion of at least 95% has been obtained, the rate of polymerisation will be unacceptably low. The selection of a higher temperature within the stipulated range will increase reaction rate, but will also increase the risk of undesirable side reactions such as decarboxylations. Taking the above into account it is within the scope of the skilled person to select a proper reaction temperature.

The reaction may be performed at atmospheric pressure, at superatmospheric pressure, and/or at reduced pressure, optionally with different pressure regimens being applied during different stages of the reaction. In one embodiment the reaction mixture is kept at a pressure below atmospheric pressure for at least part of the reaction time. It is believed that the use of reduced pressure will lead to a product with a lower density. In one embodiment a pressure is applied of at most 0.5 bar, in particular at most 0.1 bar. Lower pressures may also be used, e.g., a pressure of at most 50 mbar, or a pressure of at most 10 mbar. A pressure of at most 1 mbar may even be applied. When working under reduced pressure, the lower limit will generally be determined by the apparatus used.

It is preferred for the reaction to be carried out for at least part of the time above the boiling point of water, that is, above the point where the vapor pressure of the liquid equals the environmental pressure surrounding the liquid. When the reaction is carried out at atmospheric pressure it is therefore preferred for the reaction to be carried out at a temperature above 100° C., more in particular at 105° C. or higher. When the reaction is carried at reduced pressure within this embodiment, the reaction may be carried out at lower temperatures, e.g., a temperature of between 80° C. and 100° C. at a pressure in the ranges indicated above, e.g., at a pressure of 0.10 mbar.

The polymerization time will depend on the polymerization temperature, and may vary between wide ranges. The minimum time to get a degree of polymerization of at least 90% will generally be at least 4 hours. The maximum polymerization time is not critical, but generally a time above 7 days may be less attractive from a commercial point of view. More specifically, a range of 24 hours through 5 days may be mentioned.

Combinations of various temperature and pressure regimens may be envisaged.

In one embodiment the reaction mixture is kept at a temperature of between 100° C. and 130° C. for at least part of the period from the start of the reaction until a conversion of at least 90% is obtained. More specifically, it may be desirable to keep the reaction mixture at a temperature of between 100° C. and 130° C. for the entire period from the start of the reaction until a conversion of at least 90% is obtained.

In one embodiment, the glycerol and the tri-carboxylic acid are mixed at a temperature of 100-130° C. for a period of 5 minutes to one hour. The mixture is then poured into a mould and kept there at a temperature of 100-130° C., in particular 100-120° C., for a period of 12 hours to 72 hours, in particular 12-36 hours. At that point in time a degree of polymerization of more than 90% will have been obtained. In another embodiment, glycerol and tri-carboxylic acid are mixed with water in an amount of, say 2-10 wt. %, calculated on the total of acid at a temperature in the range of 40-100° C., in particular 40-80° C. for a period of 5 minutes to one hour.

The mixture can then by poured in the mould and processed as described above.

The mixture obtained by either of the embodiments described can also be poured in a mould and kept at reduced pressure, e.g., at a pressure in the ranges as indicated above, in particular at a value below 1 mbar, e.g. below 0.5 mbar, for a period of 12-72 hours, at a temperature in the range of 80-130° C. If the foaming becomes excessive, e.g., when a relatively high temperature is used, it may be desirable to let off the pressure and then restore the vacuum, or to work at a higher, i.e. less reduced, pressure.

The rate of the polymerization may be increased by seeding the mixture with pulverized polymer particles as seed, e.g., in an amount of 1-30 wt. %, in particular 1-20 wt. %. It has been found that the use of polymer seeds leads to a product with a lower density as compared to a corresponding material manufactured in the absence of seeds. As the skilled person can easily determine, the polymer seed particles should be large enough to be easily suspended in the medium, but small enough to be able to act as seeds. A value of 3 mm may be mentioned as suitable maximum for the average particle diameter. A value of 0.025 mm may be mentioned as suitable minimum for the average particle diameter, although smaller particles may also be used. In one embodiment, the seeds may have an average particle size of less than 2 mm, in particular less than 1 mm, more in particular in the range of 0.1-0.7 mm. It is within the scope of the skilled person to determine a suitable amount of polymer seed and a suitable particle size, taking the above into account.

The polymer seeds may be of any polymer, in particular of any polyester. In one embodiment, the seeds are of a citric acid—glycerol polymer, in particular of a citric acid—glycerol polymer manufactured in accordance with the present specification (i.e. self-seeding). This has the advantage that the material that is obtained has a homogeneous chemical composition. In another embodiment, the seeds are of a polymer based on other monomers than citric acid or glycerol, either in addition to or instead of the citric acid and/or glycerol.

The step of combining the reactants to obtain a mixture will be carried out under mixing. The final stage of the polymerization, e.g., between a degree of polymerization of 70% and a degree of polymerization of 90% or higher will be carried out in the absence of a mixer, e.g., in a mould. The first stage of polymerization, e.g., until a degree of polymerization of 70% may be carried out while mixing. The absence of mixing is considered preferred, however.

It has been found that the polymers shows strong adherence to glass and metal. The final stages of the polymerization reaction are therefore preferably carried out in a vessel provided with a non-stick coating. This can be, for example, a Teflon coating, or a silicone coating. Suitable coating materials are known in the art.

It is preferred for the mixing and reaction stage until a degree of conversion of 90%, or higher as indicated above, is obtained to take place in an inert atmosphere, e.g., under nitrogen or argon, to prevent reaction of the polymer or the monomers with the oxygen from the air, which may result in yellowing of the polymer. It should be noted that once the desired degree of polymerization is reached, contacting the polymer with air will not cause problems anymore.

The polymer with a degree of conversion of 90% may be attractive for various purposes, in particular for those where a certain degree of biodegradability is desired, e.g., in packaging applications. However, in cases where a more stable material is desired, with a longer degradation time, a higher degree of polymerization may be more attractive. In this case, a degree of polymerization of at least 93%, at least 96%, or at least 98% may be aimed for.

In general, the materials with a lower degree of conversion will be more flexible than materials with a higher degree of conversion.

The polymer of the present invention has a density of below 850 gram/l. The density will generally be above 200 g/l. More specifically, the density will be between 300 and 700 gram/l. Lower-density materials will be attractive for packaging applications. However, higher density materials may have better strength and better dimensional stability. In one embodiment the present invention is directed to polymers with a density of 500 to 850 g/l, in particular 550-700 g/l. In another embodiment, the polymer has a density in the range of 200 to 499 g/l, in particular in the range of 300-450 g/ml. While not wishing to be bound by theory, the formation of the foam is believed to be caused by two effects, that may act separately or in combination. A first effect of which it is believed that it may take place is that the water that is released during the esterification reaction may act as a propellant for the foam. A second effect of which it is believed that it may take place is that in the final stages of conversion the reaction of the glycerol with its specific structure with the tri-carboxylic acid with its specific structure may lead to the formation of a specific three-dimensional structure.

Taking these mechanisms into account, the density of the resulting polymer may be influenced as follows.

Performing the reaction at low pressure may decrease the density of the resulting polymer, e.g., application of a pressure in the ranges indicated for reduced pressure above, in particular below 1 mbar, more in particular below 0.05 mbar.

An important feature in obtaining a low density material is the selection of the shape of the mould in which the polymerization reaction takes place, or in other words, the thickness of the layer of the liquid composition when it is provided to the mould. If the thickness of the layer of reaction mixture when it is provided to the mould is relatively small, the water released during the polymerization has a relatively short pathway before it is released from the polymer, and its propellant activity will be less. If the layer thickness is larger, the water will have a longer way to travel, and the density of the resulting polymer will be lower. Depending on the desired object obtained, the thickness of the layer of reaction mixture when it is provided to the mould is at least 5 mm, more in particular at least 10 mm. The layer thickness may be much higher, e.g. at least 20 mm, or at least 50 mm, or at least 100 mm, or even at least 200 mm. The foamed final product will of course have a much larger height than the height of the layer of reaction mixture when it is provided to the mould.

Using an increased amount of water in the reaction medium may result in a material with a lower density. Water may, e.g., be added in an amount of at least 2 wt. % on the total of acid and glycerol. More specifically, water may be added in an amount between 2 and 10 wt. %.

Taking the above parameters into account it is within the scope of the skilled person to determine a preparation method that will result in a polymer with a density within the desired range.

In contrast with the process described in WO2010/059925, the process according to the present invention is suitable for the manufacture of large-scale objects. This is not possible with the method described in WO2010/059925 because the high-temperature post-curing step can only be performed successfully for relatively small objects. The polymer is a heat insulator, and therefore time will be required for the core temperature of the object to reach the desired value. If the object has a mass of about 100 grams or higher, the time required for the core temperature to reach the desired value will be so high that the shell of the object will start to disintegrate or decompose. In the present invention this effect does not occur.

Accordingly, in one embodiment the present invention pertains to a process wherein the reaction mixture reacted to a degree of polymerization of at least 90% has a mass of at least 100 grams, in particular at least 200 grams, more in particular at least 500 grams. The actual size of the polymer object to be produced is not further limited, and may be as large as required. If so desired it can later be converted into suitable pieces.

The shortest distance between the centre of the object to be formed by the polymerization and the exterior of the object may be at least 2 mm, more in particular at least 4 mm, depending on the use.

The foamed polymer that may be manufactured by the process according to the invention has many uses.

Due to its environmentally friendly nature and biodegradability, it may be attractive as packaging material. This goes in particular for the materials with a degree of polymerization of between 90% and 95% and/or a density below 500 grams/l. The fact that the material has a clean burning profile (no heteroatoms, no aromatics), the less biodegradable materials may also be attractive as packaging material. It should also be noted that the material is completely non-toxic.

The material according to the invention may be used as such, or in combination with other materials.

The material would be particularly attractive as packaging or decoration material for foodstuff and culinary exhibitions, because it allows the packaging and any remaining foodstuff to be disposed of without separation being necessary, as the polymer is biodegradable. It's non-toxic nature also makes it particularly suitable for foodstuff applications.

The material can also be used as insulation material, e.g., in buildings, but also in industrial or laboratory applications. Depending on the expected life cycle and conditions of use it may be desired for this material to have a degree of conversion of at least 95%, more in particular at least 97%, or higher as discussed above. The insulation material may have a thickness of at least 0.5 cm, in particular at least 1 cm.

It may be used as a layer in combination with layers of other materials.

The material can also be used in the manufacture a large variety of products with a relatively short life cycle, e.g., disposable products. Examples include toys for children which can be thrown away and biodegraded or burnt after use. A further example are objects for temporary installations, e.g., for exhibitions, film-sets etc. One embodiment could be the manufacture of biodegradable snowflakes.

The present invention is illustrated by the following non-limiting examples.

EXAMPLE 1

Polymerization Process Using Catalyst

Glycerol 5 gram (Reagent Grade) and 10 gram citric acid monohydrate (1:1 molar ratio) were heated with stirring in an open beaker at 120° C. for 15 minutes. P-toluenesulphonic acid, 50 mg, was added as catalyst, and the warm clear liquid was poured in a mould with an inert surface—a flexible silicone rubber mould or a Teflon coated steel tray. The sample was kept at 105° C. for 20 hrs at atmospheric pressure after which a freestanding polyester foam—density 500-600/ml—was secured. The degree of conversion was about 95%. Combustion analysis showed a carbon content of 42.62% and a hydrogen content of 5.24%. The foam slowly disintegrates when immersed in water over a period of 2-3 months.

EXAMPLE 2

Polymerization Process

Glycerol 10 gram Reagent Grade, 20 gram citric acid monohydrate and 3 gram deionized water were heated in an open beaker to 60° C. for 15 minutes. The clear warm solution was poured on a silicone rubber mat. The film spreads to approximately 1 gram/cm2. The sample was kept in an oven at 115° C. for 20 hrs. After cooling a 2-3 mm thick slightly flexible freestanding foam—faintly yellow color due to not using a nitrogen atmosphere—was secured in which the cells are evenly spread with a diameter between 0.2 and 2 mm. Density was 620 mg/ml. The degree of conversion was about 95%.

EXAMPLE 3

Post-Curing at High Temperature

The sample prepared in Example 2 was kept in an oven at 150° C. for 3 hours. A freestanding stiff foam was obtained—7.8 gram—optically identical with the previous foam. The density was also the same. The degree of conversion was about 100%.

EXAMPLE 4

Polymerization with Reduced-Pressure Curing

Citric acid monohydrate 15 gram and glycerol reagent grade 7.5 gram were heated with stirring in an open beaker at 120° C. for 30 minutes. The clear colorless viscous liquid was poured in a Teflon coated metal tray covering an area of approximately 25 cm2 and kept in a vacuum oven at 120° C. and 0.1 mbar. After 45 minutes the liquid starts to foam and this foam was collapsed by restoring atmospheric pressure. The temperature was lowered to 85° C. and the material was again submitted to 0.1 mbar pressure for 18 hrs. After dislodgement from the inert Teflon surface, a sheet of a colorless transparent flexible foam was obtained. Immersion in water for several weeks slowly decoheres the foam. The degree of conversion was about 95%. The material had a density of about 450 mg/ml.

EXAMPLE 6

Polymerization in the Presence of Seed

Glycerol reagent grade 10 gram and citric acid monohydrate 20 gram were heated in an open beaker with stirring to 120° C. for 15 minutes. A sample of the cured resin made in example 1, 3 grams, was pulverized in a mortar and hand-grinded to a fine powder. This powder was added to the clear glycerol/citric acid viscous liquid. Stirring and heating at 120° C. was continued for 15 minutes.

The suspension was poured into a silicon rubber mould—circular 6 cm diameter—and cured at 120° C. for 18 hours. The resultant foam—11.8 gram—has a density of 400 mg/ml. The degree of conversion was above 90%.

EXAMPLE 7

Polymerization Example

Glycerol reagent grade 150 gram and citric acid monohydrate 300 gram were heated at 100° C. for 30 minutes with stirring in an open beaker to form a liquid. 25 ml of deionized water were added and the resultant clear colorless liquid, approximately 400 ml, was poured in a silicone-rubber mould (10-25 cm2 area and a depth of 10 cm, a volume of 2500 cm3). The mould was kept in an oven with nitrogen atmosphere horizontally at 110° C. for 20 hrs. At this point the density of the resulting white stiff foam was 345 mg/ml. The degree of conversion is above 90%. The stiff foam was post-cured at 115° C. for 4 hrs in nitrogen atmosphere. Density of the post-cured foam was 343 mg/ml. Degree of conversion of the post-cured stiff foam was above 95%.

EXAMPLE 8

Preparation of Free Standing Low-Density Foam Via Seeding

A stock solution of 1 kg citric acid monohydrate in 500 ml of 90% glycerol in water was prepared by dissolving the solid citric acid into the liquid glycerol solution with stirring at 90° C. To 600 ml of the solution 120 grams of powdered foam polymer was added with stirring at 120° C. The particle size of the mechanically grinded powered was 0.1 mm-0.05 mm. After 1 hour of stirring at 120° C. the viscous liquid was poured into a circular silicone-rubber mould with 30 cm diameter and 5 cm height rim. The mould was kept in an oven at 120° C. for 20 hours. After this period the yellow open cell foam (volume 1.8 liter) was allowed to cool. The free standing foam was post-cured in the oven at 150° C. for 5 hrs to reach a conversion based on weight loss of 97%. The Tg of the final product is 120° C. and the material is not intrinsically hygroscopic.

A machined sample of 10*5*1 cm has a density of 212 mg/ml and an empty volume of 86%.

When this procedure was repeated without addition of powdered foam product, a foam was obtained with a density of 432 mg/ml and an empty volume of 72%.

EXAMPLE 9

Polymer Synthesis in High Mould

Of the stock solution of citric acid in glycerol prepared in Example 8, 120 ml was poured into a glass cylinder 500 ml, 3 cm diameter, lined on the inside with a thin silicone rubber sheet. After curing at 120° C. for 60 hours a cylindrical foam was obtained with a volume of 400 ml. The freestanding foam was post-cured at 150° C. for 5 hrs. The resulting material had a density of 235 mg/ml and a flexural strength of 55 Mpa.

Comparative Example A

Glycerol Itaconic Acid Polymer

Glycerol 13.2 gram and itaconic Acid, 26 gram (2:3 molar ratio) were heated in an open beaker with stirring at 165 C for 2 hours. P-toluene-sulfonic acid 100 mg was added and the viscous liquid was poured in a silicone rubber mould—circular diameter 6 cm—and kept in an oven for 20 hrs. A yellow thick circular disc was obtained with a density exceeding 1 gr/ml. No foaming took place. Combustion analysis showed a carbon content of 49.69% and a hydrogen content of 6.05%.

Comparative Example B

Reworking WO2010/059925

The process of WO2010/059925 was reworked as follows (derived from Example 8): 20 grams of glycerol reagent grade and 40 grams of citric acid monohydrate were mixed The mixture was brought under nitrogen to a temperature of 140° C. while stirring, and kept under nitrogen at that temperature for a period of one hour. The resulting prepolymer was heated to 185° C. for a period of one hour. Uncontrollable foaming took place resulting in an inhomogeneous foam. The material discolored to yellow, and was brittle.

Comparative Example C

Reworking WO2010/059925

The process of WO2010/059925 was reworked as follows (derived from Examples 1 and 12): 20 grams of glycerol reagent grade and 40 grams of citric acid monohydrate were mixed The mixture was brought under nitrogen to a temperature of 140° C. while stirring, and kept under nitrogen at that temperature for a period of one hour. The resulting prepolymer was heated to 204° C. for a period of one hour. Uncontrollable foaming took place resulting in an inhomogeneous foam. The material discolored to yellow and had poor mechanical properties. Combustion analysis showed a carbon content of 43.76% and a hydrogen content of 5.56%, showing that about 5-10% of the citric acid decarboxylated to form itaconic acid.

Comparative Example D

Reworking U.S. Pat. No. 6,861,498

The Process of U.S. Pat. No. 6,861,498 was reworked on the basis of Example 10. 10 grams citric acid monohydrate were combined with 5 grams glycerol reagent grade. When the mixture was heated to 170° C., a thick foaming brown gel was obtained, which emitted smoke and the smell of itaconic acid.

The invention claimed is:

1. A process for producing a glycerol tri-carboxylic acid polyester foam which comprises: combining glycerol and a tri-carboxylic acid in liquid phase to provide a reaction mixture, and keeping the reaction mixture at a temperature from 80° C. to 130° C. from start of reaction until a conversion of at least 90% is obtained, thereby forming a foam.

2. The process according to claim 1 wherein the tri-carboxylic acid is citric acid.

3. The process according to claim 1, wherein the temperature of the reaction mixture is not elevated above 130° C. before a conversion of at least 95% has been obtained, optionally, a conversion of at least 98%.

4. The process according to claim 1, wherein the temperature of the reaction mixture is not elevated above 125° C. before a stipulated degree of conversion is obtained, optionally not above 120° C.

5. The process according to claim 1, wherein reaction is carried out for at least a portion of time above the boiling point of water, optionally above the point where vapor pressure of liquid equals environmental pressure surrounding the liquid.

6. The process according to claim 1, wherein the reaction mixture is seeded with pulverized polymer particles as seed, optionally in an amount of 1-30 wt. %.

7. The process according to claim 6 wherein the polymer seed comprises a glycerol-citric acid polymer.

8. The process according to claim 6 wherein the seed is of a polymer based on monomers other than citric acid or glycerol.

9. The process according to claim 1, wherein water is added to the reaction mixture in an amount of at least 2 wt. % on the total of acid and glycerol, optionally in an amount from 2 to 10 wt. %.

10. The process according to claim 1, wherein the reaction mixture reacted to a degree of polymerization of at least 90% has a mass of at least 100 grams, optionally at least 200 grams.

11. The process according to claim 1, wherein reaction is carried out in the absence of catalyst.

12. The process according to claim 1, wherein the reaction mixture is kept at a pressure below atmospheric pressure for at least a portion of reaction time.

13. The process according to claim 1, wherein a height of the reaction mixture when it is provided to a mould is at least 10 mm, optionally at least 20 mm.

* * * * *